United States Patent [19]
Komori et al.

[11] Patent Number: 5,512,385
[45] Date of Patent: Apr. 30, 1996

[54] HYDROGEN STORAGE ALLOY AND NICKEL-METAL HYDRIDE STORAGE BATTERY USING THE SAME

[75] Inventors: Katsunori Komori, Kadoma; Osamu Yamamoto, Hirakata; Yoshinori Toyoguchi; Kohei Suzuki, both of Yao; Seiji Yamaguchi; Ayako Tanaka, both of Osaka; Munehisa Ikoma, Shiki, all of Japan

[73] Assignee: Matsushita Electric Industrial Co., Ltd., Osaka, Japan

[21] Appl. No.: 392,579

[22] Filed: Feb. 23, 1995

[30] Foreign Application Priority Data

Feb. 28, 1994 [JP] Japan ................... 6-030548

[51] Int. Cl.⁶ ........................................ H01M 4/38
[52] U.S. Cl. .......................... 429/101; 429/218; 420/455; 420/580; 420/900
[58] Field of Search ................ 429/59, 101, 206, 429/218, 220, 221, 224, 223; 420/455, 580, 581, 582, 583, 587, 588, 900; 252/182.1

[56] References Cited

U.S. PATENT DOCUMENTS

| | | | |
|---|---|---|---|
| 4,396,576 | 8/1983 | Osumi et al. | 420/455 |
| 4,702,978 | 10/1987 | Heuts et al. | 429/218 |
| 5,096,665 | 3/1992 | Fujitani et al. | 420/422 |
| 5,242,656 | 9/1993 | Zhang et al. | 420/417 |
| 5,284,619 | 2/1994 | Hazama | 420/455 |
| 5,290,509 | 3/1994 | Furukawa et al. | 420/455 X |
| 5,376,474 | 12/1994 | Tadokoro et al. | 429/59 |

FOREIGN PATENT DOCUMENTS

| | | |
|---|---|---|
| 60-250558 | 12/1985 | Japan . |
| 62-139258 | 6/1987 | Japan . |
| 63-164161 | 7/1988 | Japan . |
| 63-304570 | 12/1988 | Japan . |
| 1-162741 | 6/1989 | Japan . |
| 3-294444 | 12/1991 | Japan . |
| 4-173933 | 6/1992 | Japan . |
| 4-169059 | 6/1992 | Japan . |
| 4-358008 | 12/1992 | Japan . |
| 5-195122 | 8/1993 | Japan . |

Primary Examiner—Anthony Skapars
Attorney, Agent, or Firm—Panitch, Schwarze, Jacobs & Nadel

[57] ABSTRACT

A hydrogen storage alloy for negative electrodes in an alkaline storage battery is disclosed. The alloy is represented by the general formula $MmNi_xM_y$, wherein Mm is a misch metal or a mixture of rare earth elements, and M is at least one element selected from the group consisting of Al, Mn, Co, Cu, Fe, Cr, Zr, Ti and V and wherein $5.0 \geq x+y \geq 5.5$, and has a microstructure comprising a phase composed of a crystal structure of $CaCu_5$ type and is capable of absorbing and desorbing hydrogen in a reversible manner, and at least one phase consisting mainly of an element or elements other than Mm, and incapable of storing hydrogen.

17 Claims, 7 Drawing Sheets

F I G. 1
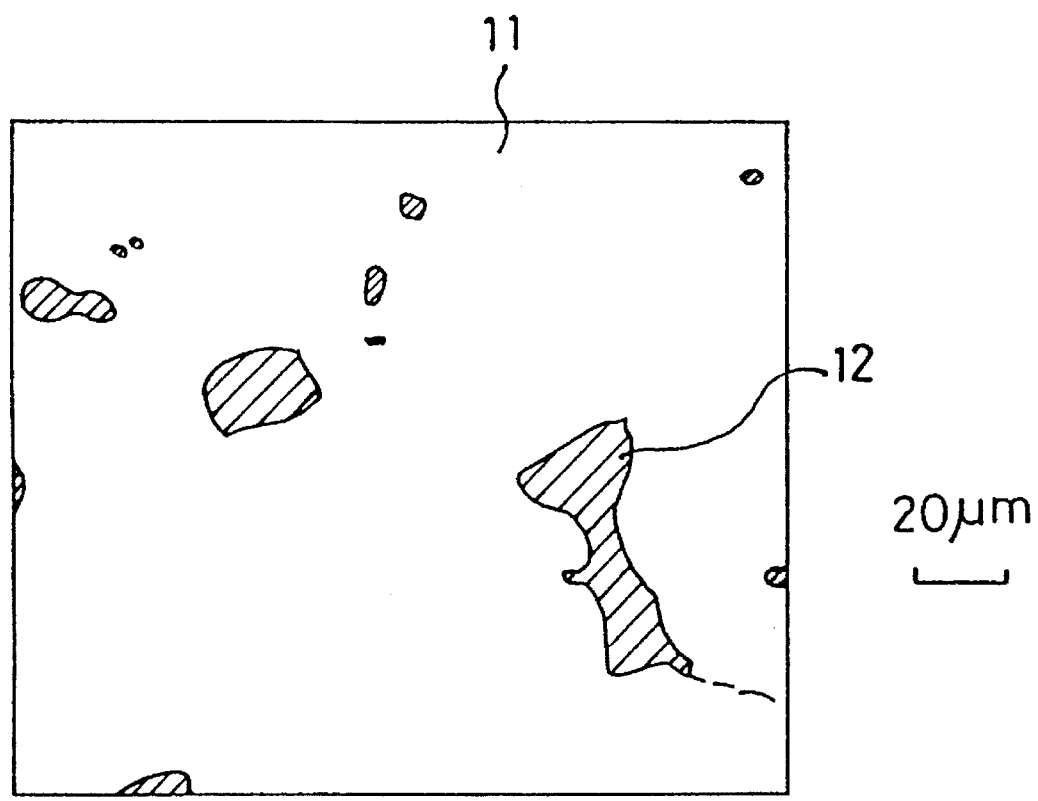

HYDROGEN STORAGE ALLOY AND NICKEL-METAL HYDRIDE STORAGE BATTERY USING THE SAME

BACKGROUND OF THE INVENTION

1. Field of the Invention

The present invention relates to a hydrogen storage alloy which can electrochemically absorb and desorb hydrogen in a reversible manner, and to a nickel-metal hydride storage battery using the same.

2. Description of the Prior Art

In recent year, nickel-metal hydride storage batteries, which employ, as their negative electrodes, a hydrogen storage alloy which can electrochemically absorb and desorb hydrogen in a reversible manner, have been attracting attention in this art as rechargeable batteries having a high energy density and a long cycle life. Recent development in portable electric and electronic appliances utilizing the rechargeable batteries directed to high performance and wide diversification are drawing attention. Since the nickel-metal hydride storage batteries are excellent in their energy density and cycle life as compared with the conventional rechargeable batteries such as nickel-cadmium storage batteries, their production is estimated to increase in the near future.

The currently known hydrogen storage alloy is generally classified into two types: $AB_5$-type mainly composed of a rare earth element and nickel (Ni) or the like metal, and $AB_2$-type mainly composed of zirconium (Zr), manganese (Mn) and the like metal. At present, nickel-metal hydride rechargeable batteries employing the hydrogen storage alloy of $AB_5$-type are mainly used as a power source of the portable electric and electronic appliances.

It has hitherto been known that the cycle life of the nickel-metal hydride storage battery using the hydrogen storage alloy of $AB_5$-type can be improved by adding cobalt (Co) to the alloy. In view of this, a number of proposals have been made on the hydrogen storage alloy containing Co (for instance, Japanese Laid-Open Patent Publications No. Sho 60-250,558, No. Sho 62-139,258, No. Sho 63-164,161, No. Sho 63-304,570 and No. Hei 1-162,741). The currently available hydrogen storage alloys for the nickel-metal hydride storage batteries disclosed in these prior arts contain Co by 10 wt % or more.

Further, the hydrogen storage alloys of practical use at present have been still under development in order to make such alloys as homogeneous as possible, and in the case of $AB_5$-type alloy, the alloy microstructure has in general a macroscopically single phase. However, there are some proposals for making the alloy microstructure multi-phased and most proposals are directed to a co-existence of two hydrogen storage phases (for instance, Japanese Patent Publication No. Hei 6-38,333, Japanese Laid-Open Patent Publication No. Hei 5-195,122 and the like).

However, a storage battery having further longer cycle life is eagerly demanded in the commercial market. In particular, when an application for an electric vehicle (automobile) using a nickel-metal hydride storage battery as its energy source is developed, a storage battery having a longer cycle life which can repeat charging and discharging cycles for about 10 years will be required. And there has been a problem that the nickel-metal hydride storage batteries using the conventional hydrogen storage alloy do not have a sufficient cycle life.

Further, the alloys containing a large amount of Co demonstrate a favorable cycle life characteristic but have a disadvantage that their high-rate discharge characteristic of a battery configured with this alloy is inferior to that of the alloy containing no Co. In view of this, an achievement of a longer cycle life of the hydrogen storage alloy by any means except for the addition of Co has hitherto been desired.

SUMMARY OF THE INVENTION

It is therefore a primary object of the present invention to provide a hydrogen storage alloy having excellent performance characteristics, especially longer cycle life and high-rate discharging characteristics as compared with the conventional hydrogen storage alloy.

Another object of the present invention is to provide a hydrogen storage alloy having a longer cycle life and high-rate discharging characteristics which can be manufactured at a low price without adding a large amount of Co.

It is a further object of the present invention to provide a nickel-metal hydride storage battery which employs the above-mentioned hydrogen storage alloy as its negative electrode.

The present invention provides a hydrogen storage alloy represented by the general formula $MmNi_xM_y$, wherein Mm is a misch metal or a mixture of rare earth elements, and M is at least one element selected from the group consisting of Al, Mn, Co, Cu, Fe, Cr, Zr, Ti and V, and wherein $5.0 \geq x+y \geq 5.5$, said alloy having a microstructure comprising:

- a phase which is composed of a crystal structure of $CaCu_5$ type, and is capable of absorbing and desorbing hydrogen in a reversible manner, and
- at least one phase which consists mainly of an element or elements other than Mm, and is incapable of storing hydrogen.

In a preferred embodiment of the present invention, Mm content of the phase incapable of storing hydrogen is less than 5 wt %.

In another preferred embodiment of the present invention, $5.2 \geq x+y \geq 5.5$.

A preferred hydrogen storage alloy in the above-mentioned general formula, wherein M is Al, Mn, Cu and Co, is represented by the general formula $MmNi_aAl_bMn_cCu_dCo_e$, wherein Mm is a misch metal or a mixture of rare earth elements, and wherein $0.2 \geq b \geq 0.8$, $0.2 \geq c \geq 0.8$, $0.8 \geq b+c \geq 1.4$, $0 \geq d \geq 0.8$, $0 \geq e \geq 0.3$, and $5.2 \geq a+b+c+d+e \geq 5.5$, and an amount of La contained in Mm is in a range between 40 wt % and 70 wt %.

A preferred hydrogen storage alloy in the above-mentioned general formula, wherein M is Al, Mn, Cu, Co and Fe, is represented by the general formula $MmNi_aAl_bMn_cCu_dCo_eFe_f$, wherein Mm is a misch metal or a mixture of rare earth elements, and wherein $0.2 \geq b \geq 0.8$, $0.2 \geq c \geq 0.8$, $0.8 \geq b+c \geq 1.4$, $0 \geq d \geq 0.8$, $0 \geq e \geq 0.3$, $0 < f \geq 0.3$, and $5.2 \geq a+b+c+d+e+f \geq 5.5$, and an amount of La contained in Mm is in a range between 40 wt % and 70 wt %.

A preferred hydrogen storage alloy in the above-mentioned general formula, wherein M is Al, Mn, Cu, Co, Fe and Cr, is represented by the general formula $MmNi_aAl_bMn_cCu_dCo_eFe_fCr_g$, wherein Mm is a misch metal or a mixture of rare earth elements, and wherein $0.2 \geq b \geq 0.8$, $0.2 \geq c \geq 0.8$, $0.8 \geq b+c \geq 1.4$, $0 \geq d \geq 0.8$, $0 \geq e \geq 0.3$, $0 < f \geq 0.3$, $0 < g \geq 0.1$, and $5.2 \geq a+b+c+d+e+f+g \geq 5.5$, and an amount of La contained in Mm is in a range between 40 wt % and 70 wt %.

A preferred hydrogen storage alloy in the above-mentioned general formula, wherein M is Al, Mn, Fe and Cr, is represented by the general formula MmNi$_h$Al$_i$Mn$_j$Fe$_k$Cr$_l$, wherein Mm is a misch metal or a mixture of rare earth elements, and wherein $0.2 \geq i \geq 0.8$, $0.2 \geq j \geq 0.8$, $0.8 \geq i+j \geq 1.4$, $0 \geq k \geq 0.8$, $0 \geq l \geq 0.1$, $5.2 \geq h+i+j+k+l \geq 5.5$, and an amount of La contained in Mm is in a range between 40 wt % and 70 wt %.

Further, in another preferred embodiment of the present invention, the hydrogen storage alloy is subjected to a heat treatment at a temperature of 900° C. to 1200° C. for at least one hour in a vacuum or in an inert-gas atmosphere.

The present invention also provides an electrode which employs the above-mentioned hydrogen storage alloy.

The present invention also provides a nickel-metal hydride storage battery which employs the above-mentioned electrode as its negative electrode.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 1 is a diagram showing a back scattered electron image of a cross-section of the hydrogen storage alloy ingot in accordance with an embodiment of the present invention.

Figure 2:
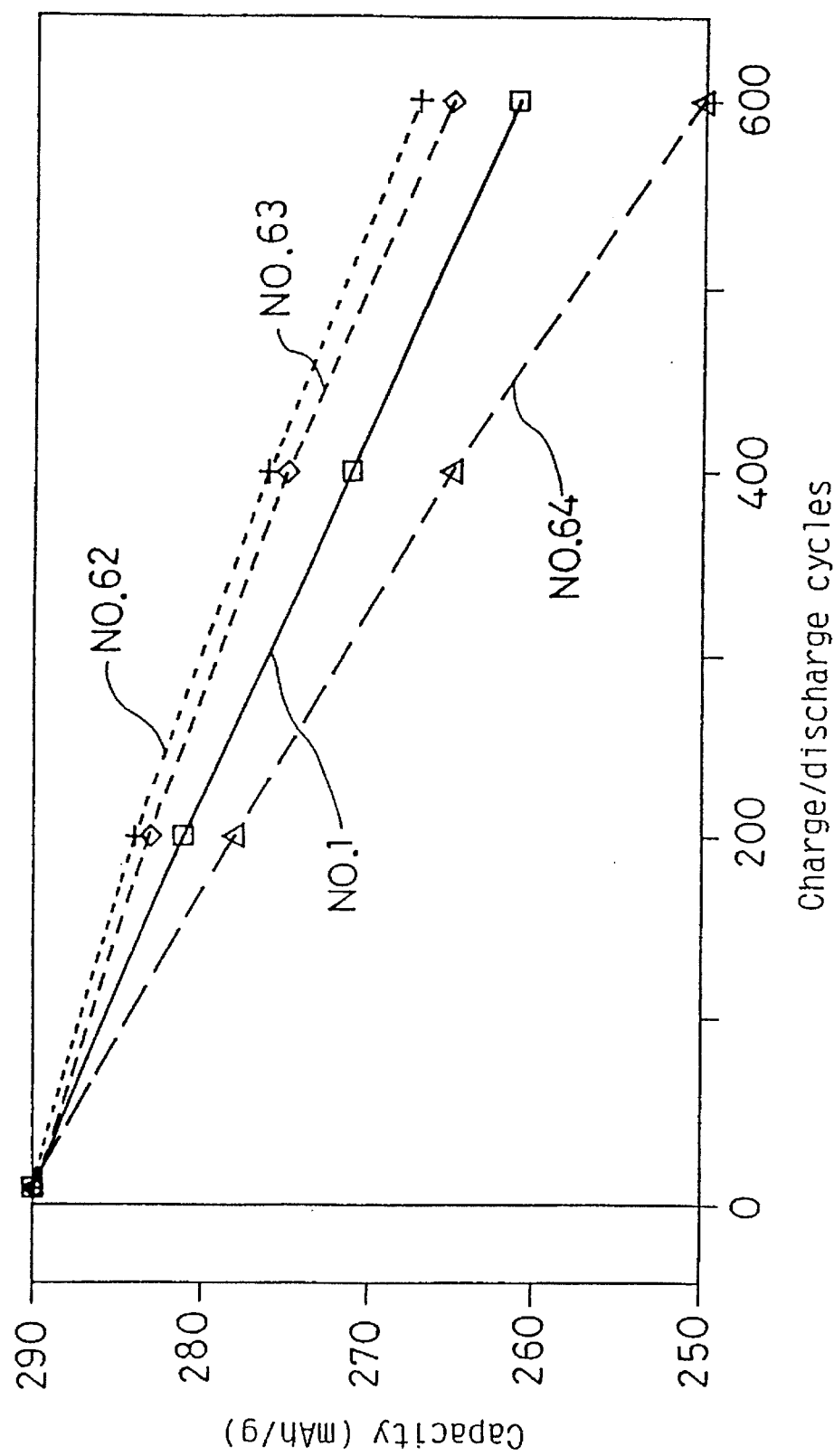
FIG. 2 is a diagram showing the relationships between the discharge capacities and the number of charge/discharge cycles of half-cells configured with hydrogen storage alloy negative electrodes with different yttrium (Y) contents.

It will be recognized that some or all of the Figures are schematic representations for purposes of illustration and do not necessarily depict the actual relative sizes or locations of the elements shown.

DETAILED DESCRIPTION OF PREFERRED EMBODIMENTS

In the following paragraphs, description will be made on preferred embodiments of the hydrogen storage alloy of the present invention.

The present invention is directed to a hydrogen storage alloy of AB$_5$-type, in particular, an alloy represented by the general formula MmNi$_x$M$_y$, wherein Mm is a misch metal or a mixture of rare earth elements, and M is at least one element selected from the group consisting of Al, Mn, Co, Cu, Fe, Cr, Zr, Ti and V, and wherein a condition of $5.0 \geq x+y \geq 5.5$. The compositions of the alloy will be specifically described with reference to the following examples.

The hydrogen storage alloy of the present invention has a microstructure comprising a phase composed of a crystal structure of CaCu$_5$ type, capable of absorbing and desorbing hydrogen in a reversible manner, and at east one other phase consisting mainly of one element or elements other than Mm, incapable of storing hydrogen.

A main cause for deteriorating the cycle life characteristic of the hydrogen storage alloy is pulverization of the hydrogen storage alloy. In particular, a hydrogen storage alloy with a small amount of or without Co may produce a remarkable pulverization.

In contrast, the hydrogen storage alloy in accordance with the present invention is scarcely pulverized by repeated charging and discharging cycles, regardless of the Co content, and thus the cycle life can be improved in a great deal.

In general, during the charging and discharging reaction of the nickel-metal hydride storage battery, the hydrogen storage alloy absorbs and desorbs hydrogen, and an expansion and contraction of the lattice in the hydrogen storage alloy are produced as a result of absorption and desorption. It is believed that stresses due to such expansion and contraction cause further pulverization of the alloy particles. In the alloy in accordance with the present invention, the phase mainly composed of an element or elements other than Mm and incapable of storing hydrogen is dispersed throughout the alloy. Further, it is believed that the phase incapable of storing hydrogen converts the phase capable of absorbing and desorbing hydrogen into a structure resistant to the stresses. Moreover, it is believed that in the alloy in accordance with the present invention, the phase which does not contain Mm or scarcely contains Mm and is incapable of storing hydrogen functions as a structure for buffering the stresses produced during the expansion and contraction of the phase capable of absorbing and desorbing hydrogen, resulting in suppression of pulverization of the alloy.

The simplest method to form the above-mentioned phase which does not contain Mm or scarcely contains Mm and is incapable of storing hydrogen is to add at least one of B-site elements (Ni, Al, Mn, Cu, Co, Fe, Cr and the like) in excess of stoichiometric amount to the alloy, namely, in a manner that a condition of $5<x+y$ is satisfied.

It is also possible to form a second phase which contains Mm in excess by satisfying a condition of $x+y <5$. However, by the formation of such phase, the cycle life characteristic cannot be improved. The second phase can contribute to the improvement in the cycle life only in the case wherein the second phase is a phase which contains only a scarce amount of Mm and is incapable of storing hydrogen.

In the hydrogen storage alloy in accordance with the present invention having the microstructure wherein the phase incapable of storing hydrogen is dispersed throughout the phase capable of absorbing and desorbing hydrogen in a reversible manner, the total area occupied by the phase incapable of storing hydrogen is preferably $100 \times 10^{-6}$ cm$^2$ or smaller for $500 \times 10^{-6}$ cm$^2$ of arbitrary cross-sectional area of the alloy ingot.

Moreover, it is possible to further improve the cycle life characteristics of the alloy in accordance with the present invention by subjecting it to a heat-treatment at a temperature ranging from 900° C. to 1200° C. at least one hour in a vacuum or an inert-gaseous atmosphere. By this heat-treatment, concentration distributions of the respective elements in boundaries between the phase which scarcely contains Mm and is incapable of storing hydrogen and the phase capable of absorbing and desorbing hydrogen in a reversible manner can distinctly be separated. By this treatment, the pulverization of the alloy is further suppressed and, as the result, the cycle life characteristic is remarkably improved.

According to the present invention, it is possible to produce a hydrogen storage alloy which attains both the long cycle life and the excellent high-rate discharge characteristics at the same time without containing a large amount of Co in the alloy as in the conventional technology.

In a preferred embodiment of the present invention, the alloy contains yttrium (Y). The content of Y is preferably 1 wt % or less.

The nickel-metal hydride storage battery in accordance with the present invention comprises an electric current generating unit composed of a positive electrode which comprises a nickel oxide or nickel hydroxide, a negative electrode which comprises the above-mentioned hydrogen storage alloy, a separator inserted between the positive electrode and the negative electrode, and an electrolyte which comprises an alkali aqueous solution, and a sealed-type battery casing provided with a safety valve which houses the electric current generating unit.

It is preferable that an operating pressure of the safety valve is 2–10 kg/cm$^2$.

Further, the electrolyte is preferably an alkali aqueous solution composed of three components of potassium hydroxide (KOH), sodium hydroxide (NaOH) and lithium hydroxide, having a specific gravity in a range between 1.2 and 1.4, wherein the solute comprises KOH by 66 wt % or more, NaOH by 30 wt % or less, and LiOH by 4 wt % or less, Moreover, it is preferable that a ratio by weight of the hydrogen storage alloy included in the negative electrode is 1–2 g to 1 g of nickel hydroxide included in the positive electrode.

Further, the negative electrode is preferably an electrode configured by coating a paste comprising a hydrogen storage alloy, a binder such as a copolymer resin of styrene/butadiene and the like, and a viscosity-enhancing agent such as carboxymethyl cellulose and the like on a conductive electrode support (core material).

In the following description, the hydrogen storage alloy of the present invention will be illustrated in more detail by way of examples and comparative examples with reference to the attached drawings.

EXAMPLE 1

Table 1 below summarizes the alloy compositions, the hydrogen equilibrium pressures of the hydrogen storage alloys of the examples of the present invention and of the comparative examples, as well as the cycle life characteristics and high-rate discharge characteristics of the half-cells comprising the negative electrodes configured with these hydrogen storage alloys.

(1) Preparation of Alloy Samples

By mixing the respective component elements such as Mm, Ni, Mn, Al, Cu, Co, Fe, Cr, Zr, Ti, V and Y in predetermined proportions and melting the mixtures in a high frequency melting furnace in an argon atmosphere, ingots of the hydrogen storage alloys having the compositions listed in Table 1 were prepared. The ingots were then subjected to a heat-treatment in an argon atmosphere at 1000° C. for 10 hours. The conditions of the heat-treatment were determined based on the obtained data which will be described later. By pulverizing these ingots, alloy powders each having an average particle size of 30 μm were prepared. An Mm alloy having a composition of La (45 wt %), Ce (39 wt %), Nd (12 wt %) and Pr (4 wt %) was used for preparation of the alloy Sample Nos. 1–24. Other alloy samples having different La contents were prepared by adjusting the ratio by weight of Ce:Nd:Pr to a fixed value of 39:12:4, and varying the La content as listed in Table 1.

TABLE 1

| Sample No. | Composition (atomic ratio) | | | | | | Amount of La in Mm (wt %) | B/A ratio* |
|---|---|---|---|---|---|---|---|---|
| | Mm | Ni a | Al b | Mn c | Cu d | Co e | | |
| 1 | 1 | 4.0 | 0.5 | 0.5 | 0.4 | 0.1 | 45 | 5.5 |
| 2 | 1 | 4.5 | 0 | 0.5 | 0.4 | 0.1 | 45 | 5.5 |
| 3 | 1 | 4.3 | 0.2 | 0.5 | 0.4 | 0.1 | 45 | 5.5 |
| 4 | 1 | 3.7 | 0.8 | 0.5 | 0.4 | 0.1 | 45 | 5.5 |
| 5 | 1 | 3.5 | 1 | 0.5 | 0.4 | 0.1 | 45 | 5.5 |
| 6 | 1 | 4.5 | 0.5 | 0 | 0.4 | 0.1 | 45 | 5.5 |
| 7 | 1 | 4.3 | 0.5 | 0.2 | 0.4 | 0.1 | 45 | 5.5 |
| 8 | 1 | 3.7 | 0.5 | 0.8 | 0.4 | 0.1 | 45 | 5.5 |
| 9 | 1 | 3.5 | 0.5 | 1 | 0.4 | 0.1 | 45 | 5.5 |
| 10 | 1 | 4.4 | 0.3 | 0.3 | 0.4 | 0.1 | 45 | 5.5 |
| 11 | 1 | 4.2 | 0.4 | 0.4 | 0.4 | 0.1 | 45 | 5.5 |
| 12 | 1 | 3.8 | 0.6 | 0.6 | 0.4 | 0.1 | 45 | 5.5 |
| 13 | 1 | 3.6 | 0.7 | 0.7 | 0.4 | 0.1 | 45 | 5.5 |
| 14 | 1 | 3.4 | 0.8 | 0.8 | 0.4 | 0.1 | 45 | 5.5 |
| 15 | 1 | 4.2 | 0.5 | 0.5 | 0.2 | 0.1 | 45 | 5.5 |
| 16 | 1 | 4.1 | 0.5 | 0.5 | 0.3 | 0.1 | 45 | 5.5 |
| 17 | 1 | 3.9 | 0.5 | 0.5 | 0.5 | 0.1 | 45 | 5.5 |
| 18 | 1 | 3.6 | 0.5 | 0.5 | 0.8 | 0.1 | 45 | 5.5 |
| 19 | 1 | 3.4 | 0.5 | 0.5 | 1 | 0.1 | 45 | 5.5 |
| 20 | 1 | 4.1 | 0.5 | 0.5 | 0.4 | 0 | 45 | 5.5 |
| 21 | 1 | 4.05 | 0.5 | 0.5 | 0.4 | 0.05 | 45 | 5.5 |
| 22 | 1 | 3.9 | 0.5 | 0.5 | 0.4 | 0.2 | 45 | 5.5 |
| 23 | 1 | 3.8 | 0.5 | 0.5 | 0.4 | 0.3 | 45 | 5.5 |
| 24 | 1 | 3.7 | 0.5 | 0.5 | 0.4 | 0.4 | 45 | 5.5 |
| 25 | 1 | 4.0 | 0.5 | 0.5 | 0.4 | 0.1 | 20 | 5.5 |
| 26 | 1 | 4.0 | 0.5 | 0.5 | 0.4 | 0.1 | 30 | 5.5 |
| 27 | 1 | 4.0 | 0.5 | 0.5 | 0.4 | 0.1 | 40 | 5.5 |
| 28 | 1 | 4.0 | 0.5 | 0.5 | 0.4 | 0.1 | 60 | 5.5 |
| 29 | 1 | 4.0 | 0.5 | 0.5 | 0.4 | 0.1 | 70 | 5.5 |
| 30 | 1 | 4.0 | 0.5 | 0.5 | 0.4 | 0.1 | 80 | 5.5 |
| 31 | 1 | 3.7 | 0.5 | 0.5 | 0.4 | 0.1 | 45 | 5.2 |
| 32 | 1 | 3.8 | 0.5 | 0.5 | 0.4 | 0.1 | 45 | 5.3 |
| 33 | 1 | 3.9 | 0.5 | 0.5 | 0.4 | 0.1 | 45 | 5.4 |
| 34 | 1 | 4.2 | 0.5 | 0.5 | 0.4 | 0.1 | 45 | 5.7 |

TABLE 1-continued

| Comparative Example No. | | | | | | | | |
|---|---|---|---|---|---|---|---|---|
| 1 | 1 | 3.48 | 0.5 | 0.5 | 0.4 | 0.1 | 45 | 4.98 |
| 2 | 1 | 3.3 | 0.5 | 0.5 | 0.4 | 0.1 | 45 | 4.8 |
| 3 | 1 | 3.5 | 0.3 | 0.4 | 0 | 0.8 | 45 | 5.0 |

| | Equilibrium pressure** (MPa) | Initial capacity (mAh/g) | Cycle life characteristics*** (cycle) | Discharge rate characteristics**** (%) |
|---|---|---|---|---|
| Sample No. | | | | |
| 1 | 0.04 | 290 | 600 | 94 |
| 2 | 0.103 | 290 | 300 | 92 |
| 3 | 0.082 | 290 | 500 | 94 |
| 4 | 0.011 | 280 | 600 | 93 |
| 5 | 0.009 | 260 | 400 | 94 |
| 6 | 0.105 | 280 | 500 | 94 |
| 7 | 0.079 | 280 | 600 | 95 |
| 8 | 0.014 | 310 | 600 | 93 |
| 9 | 0.008 | 300 | 400 | 94 |
| 10 | 0.098 | 290 | 500 | 92 |
| 11 | 0.054 | 290 | 600 | 93 |
| 12 | 0.031 | 290 | 600 | 92 |
| 13 | 0.013 | 290 | 500 | 94 |
| 14 | 0.008 | 280 | 400 | 91 |
| 15 | 0.05 | 290 | 600 | 92 |
| 16 | 0.042 | 290 | 600 | 92 |
| 17 | 0.037 | 280 | 600 | 91 |
| 18 | 0.036 | 270 | 600 | 90 |
| 19 | 0.029 | 260 | 600 | 89 |
| 20 | 0.038 | 290 | 400 | 96 |
| 21 | 0.043 | 290 | 500 | 95 |
| 22 | 0.037 | 290 | 600 | 88 |
| 23 | 0.044 | 290 | 600 | 85 |
| 24 | 0.041 | 290 | 600 | 79 |
| 25 | 0.079 | 270 | 700 | 95 |
| 26 | 0.06 | 280 | 600 | 93 |
| 27 | 0.048 | 290 | 600 | 92 |
| 28 | 0.033 | 300 | 600 | 92 |
| 29 | 0.025 | 310 | 600 | 92 |
| 30 | 0.022 | 300 | 500 | 91 |
| 31 | 0.019 | 300 | 500 | 92 |
| 32 | 0.028 | 290 | 500 | 94 |
| 33 | 0.033 | 290 | 600 | 94 |
| 34 | 0.048 | 260 | 700 | 95 |
| Comparative Example No. | | | | |
| 1 | 0.018 | 300 | 200 | 93 |
| 2 | 0.012 | 300 | 200 | 90 |
| 3 | 0.082 | 300 | 550 | 77 |

*a + b + c + d + e
**Equilibrium hydrogen plateau pressure measured in an atmosphere at 45° C.
***Number of cycles at which the discharge capacity of the evaluated half-cell drops to 90% of the initial value
****(2C discharge capacity)/(0.2C discharge capacity) × 100 (%)

After the surfaces of the alloy powders were activated by stirring the powders in a potassium hydroxide aqueous solution having a specific gravity of 1.30 at 80° C. for one hour, the powders were dehydrated and dried to obtain the alloy samples for the negative electrodes of the batteries.

(2) Configuration of Cell for Negative Electrode Evaluation

Each of the pastes for the respective negative electrodes was prepared by adding 16 parts by weight of water to each of 100 parts by weight of the hydrogen storage alloy powders. This paste was filled in a rectangular substrate made of foamed nickel having a size of 7 cm×4 cm provided with a lead wire, and after drying, compressed to have a thickness of 0.5 mm. The paste-filled substrate was then coated with a dilute aqueous solution of carboxymethyl cellulose to obtain a negative electrode plate. The content of the alloy filled in the thus obtained negative electrode plate was about 6.3 g.

Each one sheet of the negative electrode plate prepared as described above was wrapped in a pocket-like separator made of a sulfonated polypropylene having a thickness of 0.15 mm, and each two of sintered-type nickel hydroxide positive electrodes were arranged on both sides of the wrapped plate. Thus prepared assembly of the positive and negative electrodes was fixed between acrylic resin plates which were further arranged on both outer sides of the electrode assembly. The fixed assembly was placed in a cylindrical battery casing made of acrylic resin, and after welding the lead wires to terminal posts respectively, a large amount (300 g) of an electrolyte consisting mainly of potassium hydroxide aqueous solution (specific gravity: 1.30 g/cm$^3$) was poured in the battery casing. After the battery casing was sealed with a lid provided with a small hole, the combined body was once evacuated to defoam, thereby to produce a flooded electrolyte half-cell of which capacity is limited by the negative electrode for evaluation. In each of the half-cells, a mercury electrode (Hg/HgO) was incorporated as a reference electrode.

(3) Evaluation of the Half-Cells

Tests for investigating the cycle life and the discharge-rate characteristics of the above-mentioned flooded electrolyte half-cells of which capacity is limited by the negative electrode were performed. The cycle life tests included a repetition of charging and discharging operations, wherein the cells were charged at a current of 1250 mA for 1 hour and discharged at a current of 1250 mA or until the potential of the negative electrode decreased to −0.6 V vs. Hg/HgO for each cycle. In each of the tests, the discharge capacities were measured every 50 cycles. After charging the cell at a current of 190 mA for 12 hours, a final or saturation discharge capacity was determined by discharging the cell at a current of 380 mA until the potential of the negative electrode decreased to −0.6 V vs. Hg/HgO.

(4) Hydrogen Storage Alloy of the Mm-Ni-Al-Mn-Cu-Co system

First, as examples of the hydrogen storage alloy of the Mm-Ni-Al-Mn-Cu-Co system, the alloy represented by the general formula MmNi$_a$Al$_b$Mn$_c$Cu$_d$Co$_e$ will be discussed. Table 1 shows the compositions and the hydrogen equilibrium pressures of these hydrogen storage alloys of samples of the working examples of the present invention and the comparative examples, as well as the initial capacities, the cycle life characteristics and the high-rate discharge characteristics of the half-cells configured with the negative electrodes comprising these alloys. In Table 1, the cycle life of the half-cell is indicated as the number of cycles in the test at the time when the discharge capacity of the half-cell as measured every 50 cycles is decreased to 90% of the initial capacity (10th cycle) thereof. The high-rate discharge characteristics are expressed as a proportion of the capacity at 2 C (0.5-hour rate) (3800 mA) discharge to the capacity at 0.2 C (5-hour rate) (380 mA) discharge. Further, the hydrogen equilibrium pressure of the alloy is measured at 45° C.

As clearly shown in Table 1, it is appreciated from the result of a comparison between Sample No. 1, one of the working examples of the present invention, and Comparative Example No. 1, one of the comparative examples, that while the cycle life of Sample No. 1 having a B/A ratio (atomic ratio of B site element to A site element, namely, a+b+c+d+e) of 5.5 amounts to 600, that of Comparative Example No. 1 having a B/A ratio of 4.98 amounts only to 200. These two half-cells were disassembled after the lapses of various cycles, and observation with a scanning electron microscope (SEM) revealed that the progress of pulverization of the alloy powder of Comparative Example No. 1 was very rapid as compared with that of Sample No. 1.

The cross-sectional structure of the alloy ingot of Sample No. 1 was investigated by back scattered electron imaging and as shown in FIG. 1, the second phase 12 was dispersed in the host hydrogen storage phase 11. By contrast, Comparative Example No. 1 was found to be an alloy composed of single phase, because no second phase was observed.

Further, it was confirmed by X-ray diffraction that the host alloy phase 11 of Sample No. 1 and the single phase of Comparative Example No. 1 have a crystal structure of $CaCu_5$-type capable of absorbing and desorbing hydrogen in a reversible manner. In contrast to this, it was appreciated from an analysis using an electron probe microanalyzer (EPMA) that the ratio by weight of the component elements of the second phase 12 in Sample No. 1 is Ni:Al:Mn:Cu:Co= 55:10:30:3:2, and that the second phase does not contain Mm and is incapable of storing hydrogen.

A detailed observation on the cross-sectional structure of the ingot of the hydrogen storage alloy of Sample No. 1 indicated that the phase which does not contain Mm and is incapable of storing hydrogen was dispersed in the phase capable of absorbing and desorbing hydrogen in a reversible manner, and that the area occupied by the phase which is incapable of storing hydrogen ranges from $5 \times 10^{-6}$ cm$^2$ to $30 \times 10^{-6}$ cm$^2$ for $500 \times 10^{-6}$ cm$^2$ of the area of the cross-section of the alloy ingot. Further, the number of the phase incapable of storing hydrogen having an area of $0.1 \times 10^{-6}$ cm$^2$ or larger dispersed in the phase capable of absorbing and desorbing hydrogen in a reversible manner was 10 or smaller for $10 \times 10^{-6}$ cm$^2$ of the area of the cross-section of the alloy ingot.

It is therefore presumed that the cycle life characteristic of the alloy in accordance with the present invention was improved by providing the phase which contains only a scarce amount of Mm and is incapable of storing hydrogen in its alloy microstructure. Further, it was found that the cycle life characteristic could be made excellent when the area occupied by the phase which is incapable of storing hydrogen is $100 \times 10^{-6}$ cm$^2$ or smaller, particularly $(1-50) \times 10^{-6}$ cm$^2$ for $500 \times 10^{-6}$ cm$^2$ of the area of the cross-section of the alloy ingot. Moreover, it was also found that such alloy was easy to produce when the B/A ratio was in a range between 5.2 and 5.5.

Next, when a comparison was made on the alloys of Sample No. 1 and Comparative Example No. 2, it was appreciated that the cycle life of Comparative Example No. 2 is 200 which is short, and from an observation on SEM of the cells disassembled after each charging and discharging cycle, it was found that the progress of pulverization of the alloy powder of Comparative Example No. 2 was rapid. When the cross-sectional structure of the alloy powder of Comparative Example No. 2 was investigated by back scattered electron imaging and by EPMA analysis, it was found that there was dispersed the second phase containing a large amount of Mm. It was therefore appreciated that the second phase had no effect on the suppression of pulverization of the alloy powder.

As a result of deliberate study, the present inventors have clarified that a phase of a composition containing Mm by 5 wt % or less, preferably containing Ni, Al, Mn and Cu at the same time is effective for improving the cycle life.

Table 1 shows a comparison between Comparative Example No. 3, which contains Co in a large amount (11.2 wt %), and Sample No. 1, which contains Co in a very small amount (1.3 wt %). From this comparison, it was appreciated that although Comparative Example No. 3 demonstrates a long cycle life by virtue of Co, it has a poor high-rate discharge characteristic. In contrast, Sample No. 1 of the present invention satisfies both the long cycle life and the excellent high-rate discharge characteristics. Further, the alloy of Comparative Example No. 3 was confirmed to be a single phase by an observation through a back scattered electron image.

Next, an optimum composition and a ground for numerical limitation on an acceptable range of the composition of the alloy represented by the formula $MmNi_aAl_bMn_cCu_dCo_e$ will be discussed.

First, from the test results on Sample Nos. 1–5, it is appreciated that when the atomic ratio b of Al to Mm is smaller than 0.2, the equilibrium hydrogen pressure will rise. Therefore, a sealed-type battery configured with a negative electrode of such an alloy will have a problem in the high temperature storing characteristic, and its cycle life will be shortened. On the contrary, if the value b is larger than 0.8, an initial capacity of the battery will become smaller (260 mAh/g) and its cycle life will be shortened. It is therefore considered that an appropriate range of the value b is such that $0.2 \geq b \geq 0.8$.

Based on the results obtained with Sample No. 1 and Sample Nos. 6–9, it was appreciated that when an atomic ratio c of Mn to Mm is smaller than 0.2, the equilibrium hydrogen pressure will rise. Therefore, a sealed-type battery configured with a negative electrode of these alloys will have a disadvantage in a high temperature storing characteristic. Although a tendency is recognized that the larger the amount of Mn is, the larger the initial capacity is, the cycle life will be shortened if the value c is larger than 0.8. It is therefore considered that an appropriate range of the value c is such that $0.2 \geq c \geq 0.8$.

Further, it is appreciated that Al and Mn are effective for lowering the equilibrium hydrogen pressure from the data on Sample Nos. 1–14 listed in Table 1; however, it is desirable that the equilibrium hydrogen pressure of the alloy is smaller than 0.06 MPa at 45° C. from the viewpoint of high temperature storing characteristic of the cell of practical use. It is therefore concluded that $0.8 \geq b+c \geq 1.4$ is preferred from the results of the tests on Sample Nos. 1–14.

Further, it is appreciated from the results of the tests on Sample Nos. 15–19 that when an atomic ratio d of Cu to Mm is larger than 0.8, the initial capacity will decrease. It is therefore considered appropriate that $d \geq 0.8$.

From the results of the tests on Sample No. 1 and Nos. 20–24, it is appreciated that when an atomic ratio e of Co to Mm is 0, the cycle life characteristic will be worsened but such an alloy still has a very long cycle life as compared with any hydrogen storage alloy containing Co such as Comparative Example Nos. 1 and 2. Although it is considered that the amount of Co may be large in view of the cycle life characteristic, if the value e is made larger than 0.3, the high-rate discharge characteristic will considerably be deteriorated. In addition, since Co is an expensive metal, an alloy containing a large amount of Co is disadvantageous in its manufacturing cost. It is therefore desirable to satisfy a condition that $0 \geq e \geq 0.3$.

From the results of the tests on Sample No. 1 and Nos. 25–30, it is appreciated that an alloy having an La content in Mm which is smaller than 40 wt % has a high equilibrium hydrogen pressure and the initial capacity of the half-cell configured with the alloy is small. It is further appreciated that an alloy having an La content in Mm exceeding 70 wt % has a slightly shorter cycle life and is less effective for lowering the equilibrium hydrogen pressure. Moreover, the price of such Mm is expensive. It is therefore decided that the La content in Mm of 40–70 wt % is suitable.

Based on the results of the tests on Sample No. 1 and Nos. 31–34, and on Comparative Example No. 1, it is considered that a B/A ratio (a+b+c+d+e) is suitable that satisfies a condition of $5.0 \geq a+b+c$ $d+e \geq 5.5$, more preferably $5.2 \geq a+b+c+d$ $+e \geq 5.5$ from the viewpoint of the cycle life. Although the larger the B/A ratio is, the higher the equilibrium hydrogen pressure is and the smaller the initial capacity is, an alloy which satisfies the condition of $5.0 \geq a+b+c+d+e \geq 5.5$ can be graded up to the practically available level by adjusting the amounts of Al, Mn and La.

Moreover, it was confirmed from the observation on back scattered electron imaging and EPMA analysis that there is a phase consisting mainly of elements other than Mm which does not store hydrogen in Sample Nos. 2–34 as in Sample No. 1. Further, the Mm content in the phase consisting mainly of elements other than Mm which does not store hydrogen was smaller than 5 wt %.

(5) Alloys of the Mm-Ni-Al-Mn-Cu-Co-Fe system

In a case of an alloy represented by the general formula $MmNi_aAl_bMn_cCu_dCo_eFe_f$ in the alloys of Mm-Ni-Al-Mn-Cu-Co-Fe system which is obtained by adding a small amount of Fe to the alloys of the Mm-Ni-Al-Mn-Cu-Co system, an effect equivalent to that of the alloys of the Mm-Ni-Al-Mn-Cu-Co system was appreciated.

For instance, an alloy represented by the formula $MmNi_{3.8}Al_{0.5}Mn_{0.5}Cu_{0.4}Co_{0.1}Fe_{0.2}$ has a composition wherein Ni in the alloy of Sample No. 1 is substituted by Fe only by 0.2 atom portion (Sample No. 35), and has a cycle life of 650 cycles and other performances equivalent to Sample No. 1.

From the study of the respective relationship of the atomic ratios a, b, c, d and e of Ni, Al, Mn, Cu and Co to Mm in the alloy represented by the formula $MmNi_aAl_bMn_cCu_dCo_eFe_f$, the La content in Mm and the B/A ratio with the performance, it was found that an optimum range of the atomic ratio of Ni, Al, Mn, Cu and Co, and the B/A ratio is the same as in the alloys of Mm-Ni-Al-Mn-Cu-Co.

That is, it is desirable that $0.2 \geq b \geq 0.8$, $0.2 \geq c \geq 0.8$, $0.8 \geq b+c \geq 1.4$, $0 \geq d \geq 0.8$, $0 \geq e \geq 0.3$, and $5.2 \geq a+b+c+d+e \geq 5.5$, and that the La content in Mm is in a range of 40 wt $\% \geq La \geq 70$ wt %. Further, an observation on an atomic ratio f of Fe to Mm revealed that some decrease in the capacity results in a region of $0.3 < f$ and therefore, it is concluded that a condition of $f \geq 0.3$ is desirable.

(6) Alloys of the Mm-Ni-Al-Mn-Cu-Co-Fe-Cr system

An investigation is also made on an alloy represented by the general formula $MmNi_aAl_bMn_cCu_dCo_eFe_fCr_g$ in the alloys of the Mm-Ni-Al-Mn-Cu-Co-Fe-Cr system, which is obtained by further adding Cr to the alloys of the Mm-Ni-Al-Mn-Cu-Co-Fe system. For instance, an alloy represented by the formula $MmNi_{3.75}Al_{0.5}Mn_{0.5}Cu_{0.4}Co_{0.1}Fe_{0.2}Cr_{0.05}$ has a composition wherein a part of Ni in the alloy of Sample No. 35 is substituted by Cr only by 0.05 atom portion, and has a cycle life of 700 cycles and is equivalent to Sample No. 1 in other performances.

From the study on the respective relationship of the atomic ratios of Ni, Al, Mn, Cu, Co and Fe to Mm in the alloy, the La content in Mm and the B/A ratio with the performance, it was found that the optimum range of the atomic ratio and that of the B/A ratio are the same as in the alloys of Mm-Ni-Al-Mn-Cu-Co-Fe system in view of the equilibrium hydrogen pressure, the cycle life and the high-rate discharge characteristics.

That is, it is desirable that $0.2 \geq b \geq 0.8$, $0.2 \geq c \geq 0.8$, $0.8 \geq b+c \geq 1.4$, $0 \geq d \geq 0.8$, $0 \geq e \geq 0.3$, $f \geq 0.3$ and $5.2 \geq a+b+c+d+e+f \geq 5.5$, and that the La content included in Mm is 40 wt $\% \geq La \geq 70$ wt %. Further, an observation on the atomic ratio g of Cr to Mm reveals a remarkable decrease in the capacity in a region of $0.1 < g$, which leads to a conclusion that a condition of $g \geq 0.1$ is desirable.

(7) Alloys of the Mm-Ni-Al-Mn-Fe-Cr system

An alloy represented by the general formula $MmNi_hAl_iMn_jFe_kCr_l$ in the alloys of the Mm-Ni-Al-Mn-Fe-Cr system will be illustrated by referring to Table 2 below.

The preparations of the alloy samples, the configurations and evaluation of the half-cells are performed in the same manner as those listed in Table 1.

The alloys of the Mm-Ni-Al-Mn-Fe-Cr system, as a whole, have a small initial capacity and an inferior discharge rate characteristic as compared with the alloys of Mm-Ni-Al-Mn-Cu-Co system, but have a longer cycle life. It is believed that this feature is attributable to the fact that Fe and/or Cr are liable to form a passive state film on the surfaces of alloy particles. Although the alloys have a slightly smaller initial capacity than the conventional alloys, they are useful in the case of designing a battery wherein the cycle life is held to be more important than the capacity.

TABLE 2

| | Composition (atomic ratio) | | | | | Amount of La in Mm (wt %) | B/A ratio* |
|---|---|---|---|---|---|---|---|
| | Mm | Ni h | Al i | Mn j | Fe k | Cr l | | |
| Sample No. | | | | | | | | |
| 37 | 1 | 4.15 | 0.4 | 0.5 | 0.3 | 0.05 | 60 | 5.4 |
| 38 | 1 | 4.55 | 0 | 0.5 | 0.3 | 0.05 | 60 | 5.4 |
| 39 | 1 | 4.35 | 0.2 | 0.5 | 0.3 | 0.05 | 60 | 5.4 |
| 40 | 1 | 3.75 | 0.8 | 0.5 | 0.3 | 0.05 | 60 | 5.4 |
| 41 | 1 | 3.55 | 1 | 0.5 | 0.3 | 0.05 | 60 | 5.4 |
| 42 | 1 | 4.65 | 0.4 | 0 | 0.3 | 0.05 | 60 | 5.4 |
| 43 | 1 | 4.45 | 0.4 | 0.2 | 0.3 | 0.05 | 60 | 5.4 |
| 44 | 1 | 3.85 | 0.4 | 0.8 | 0.3 | 0.05 | 60 | 5.4 |
| 45 | 1 | 3.65 | 0.4 | 1 | 0.3 | 0.05 | 60 | 5.4 |
| 46 | 1 | 4.45 | 0.3 | 0.3 | 0.3 | 0.05 | 60 | 5.4 |
| 47 | 1 | 4.25 | 0.4 | 0.4 | 0.3 | 0.05 | 60 | 5.4 |
| 48 | 1 | 3.85 | 0.6 | 0.6 | 0.3 | 0.05 | 60 | 5.4 |
| 49 | 1 | 3.65 | 0.7 | 0.7 | 0.3 | 0.05 | 60 | 5.4 |
| 50 | 1 | 3.45 | 0.8 | 0.8 | 0.3 | 0.05 | 60 | 5.4 |
| 51 | 1 | 4.45 | 0.4 | 0.5 | 0 | 0.05 | 60 | 5.4 |
| 52 | 1 | 3.95 | 0.4 | 0.5 | 0.5 | 0.05 | 60 | 5.4 |
| 53 | 1 | 3.65 | 0.4 | 0.5 | 0.8 | 0.05 | 60 | 5.4 |
| 54 | 1 | 3.45 | 0.4 | 0.5 | 1 | 0.05 | 60 | 5.4 |

TABLE 2-continued

| | | | | | | | |
|---|---|---|---|---|---|---|---|
| 55 | 1 | 4.1 | 0.4 | 0.5 | 0.4 | 0 | 60 | 5.4 |
| 56 | 1 | 4.0 | 0.4 | 0.5 | 0.4 | 0.1 | 60 | 5.4 |
| 57 | 1 | 3.9 | 0.4 | 0.5 | 0.4 | 0.2 | 60 | 5.4 |
| 58 | 1 | 4.05 | 0.4 | 0.5 | 0.4 | 0.05 | 20 | 5.4 |
| 59 | 1 | 4.05 | 0.4 | 0.5 | 0.4 | 0.05 | 40 | 5.4 |
| 60 | 1 | 4.05 | 0.4 | 0.5 | 0.4 | 0.05 | 70 | 5.4 |
| 61 | 1 | 4.05 | 0.4 | 0.5 | 0.4 | 0.05 | 80 | 5.4 |
| Comparative Example No. | | | | | | | | |
| 4 | 1 | 3.63 | 0.4 | 0.5 | 0.4 | | 60 | 4.98 |

| | Equilibrium pressure** (MPa) | Initial capacity (mAh/g) | Cycle life characteristics*** (cycle) | Discharge rate characteristics**** (%) |
|---|---|---|---|---|
| Sample No. | | | | |
| 37 | 0.033 | 270 | 800 | 87 |
| 38 | 0.096 | 270 | 600 | 85 |
| 39 | 0.075 | 270 | 700 | 87 |
| 40 | 0.01 | 270 | 800 | 87 |
| 41 | 0.007 | 260 | 600 | 86 |
| 42 | 0.098 | 260 | 700 | 85 |
| 43 | 0.072 | 270 | 800 | 86 |
| 44 | 0.012 | 270 | 700 | 86 |
| 45 | 0.008 | 260 | 600 | 84 |
| 46 | 0.048 | 270 | 700 | 87 |
| 47 | 0.039 | 270 | 800 | 86 |
| 48 | 0.031 | 270 | 800 | 87 |
| 49 | 0.027 | 260 | 700 | 85 |
| 50 | 0.024 | 260 | 600 | 86 |
| 51 | 0.048 | 280 | 500 | 92 |
| 52 | 0.02 | 270 | 900 | 84 |
| 53 | 0.015 | 260 | 1000 | 81 |
| 54 | 0.011 | 250 | 800 | 76 |
| 55 | 0.035 | 280 | 800 | 89 |
| 56 | 0.028 | 270 | 700 | 82 |
| 57 | 0.023 | 240 | 400 | 70 |
| 58 | 0.08 | 250 | 700 | 88 |
| 59 | 0.049 | 270 | 800 | 87 |
| 60 | 0.024 | 280 | 700 | 87 |
| 61 | 0.021 | 270 | 500 | 85 |
| Comparative Example No. | | | | |
| 4 | 0.018 | 270 | 400 | 85 |

*$g + h + i + j + k + 1$
**Equilibrium hydrogen plateau pressure measured in an atmosphere at 45° C.
***Number of cycles at which the discharge capacity of the evaluated half-cell drops to 90% of the initial value
****(2C discharge capacity)/(0.2C discharge capacity) × 100 (%)

An alloy in the scope of the present invention out of the alloys of the Mm-Ni-Al-Mn-Fe-Cr system is found to have a microstructure wherein the phase including Mm by 3 wt % at the largest and incapable of storing hydrogen is dispersed throughout the hydrogen storing phase. Comparative Example No. 4 is an alloy sample of single phase which does not have the above-mentioned microstructure in the alloys of the Mm-Ni-Al-Mn-Fe-Cr system. When a comparison is made on Sample No. 37 and Comparative Example No. 4 as listed in Table 2, it is found that the alloy in accordance with the present invention has a long cycle life. It was also appreciated that when particle diameter distributions of the alloy samples are measured by disassembling the cells, the progress of pulverization of the alloy of the working example is slower than that of the comparative example. Therefore, an alloy having a microstructure wherein the phase consisting mainly of an element or elements other than Mm and incapable of storing hydrogen is dispersed in the hydrogen storing phase has a long cycle life even if the alloy contains Fe and/or Cr but does not contain Cu and Co.

Next, a preferred composition of an alloy represented by $MmNi_hAl_iMn_jFe_kCr_l$ in the alloys of the Mm-Ni-Al-Mn-Fe-Cr system will be illustrated by referring to Table 2.

Similar to the previously mentioned alloys of the Mm-Ni-Al-Mn-Cu-Co system, Al or Mn plays an important role as an element for adjusting the equilibrium hydrogen pressure. Therefore, it is not acceptable to include too small amount of the element. On the other hand, if the alloy contains too large amount of Al, the capacity of the resultant battery will decrease. Further, if the alloy contains too large amount of Mn, the cycle life of the resultant battery will be shortened. It is therefore preferred, based on the test results performed on Sample Nos. 38–50 that $0.2 \geq i \geq 0.8$, $0.2 \geq j \geq 0.8$, and $0.8 \geq i+j \geq 1.4$.

Moreover, since it is found that if the alloy contains too large amount of Fe, the formed passive state film becomes too strong and the capacity of the resultant battery becomes remarkably small and thus it is preferred that $0 \geq k \geq 0.8$ based on the data on Sample No. 1 and Sample Nos. 51–54. Cr also has a tendency of decreasing the capacity and worsening the discharge rate characteristic of the resultant battery as Fe. On the basis of the test results on Sample Nos. 55–57, it is concluded that the atomic ratio of Cr to Mm is suitably smaller than Fe, namely $0 \geq l \geq 0.1$. Further, on a similar ground with respect to the alloys of the Mm-Ni-Al-Mn-Cu-Co system, the La content included in Mm is desirably in 40 wt % $\geq$ La $\geq$ 70 wt % from the test results on Sample Nos. 58–61.

EXAMPLE 2

In this example, an investigation was made on the alloys which contain or do not contain yttrium (Y).

First, alloy samples containing various contents of Y were prepared starting from the alloy of Sample No. 1, represented by the formula $MmNi_{4.0}Al_{0.5}Mn_{0.5}Cu_{0.4}Co_{0.1}$ (Sample Nos. 62–64). Sample No. 62 contains 0.5 wt % of Y, Sample No. 63 contains 1 wt % of Y, and Sample No. 64 contains 2 wt % of Y.

FIG. 2 shows the relationships between the capacities and the number of cycles of the half-cells configured with the alloys of these Samples, obtained under the same conditions as those in Example 1. As shown by FIG. 2, it is appreciated that an inclusion of Y by 1 wt % or less improves the cycle life of the resultant battery. In contrast, too large amount of Y will worsen the cycle life. It was also appreciated the effect of improving the cycle life is expected by incorporating Y by 1% or less, for any of the other alloys described with reference to Example 1.

EXAMPLE 3

In this example, an effect of a heat-treatment of the hydrogen storage alloy in accordance with the present invention will be illustrated.

Tables 1 and 2 summarize the data of the alloys that were subjected to the heat-treatment at 1000° C. for 10 hours, whose conditions were determined in the following manner.

An alloy having the same composition as that of Sample No. 1 but not subjected to any heat-treatment is designated as Sample No. 65, and an alloy having the same composition as that of Comparative Example No. 1 (heat-treated at 1000°

Figure 3:
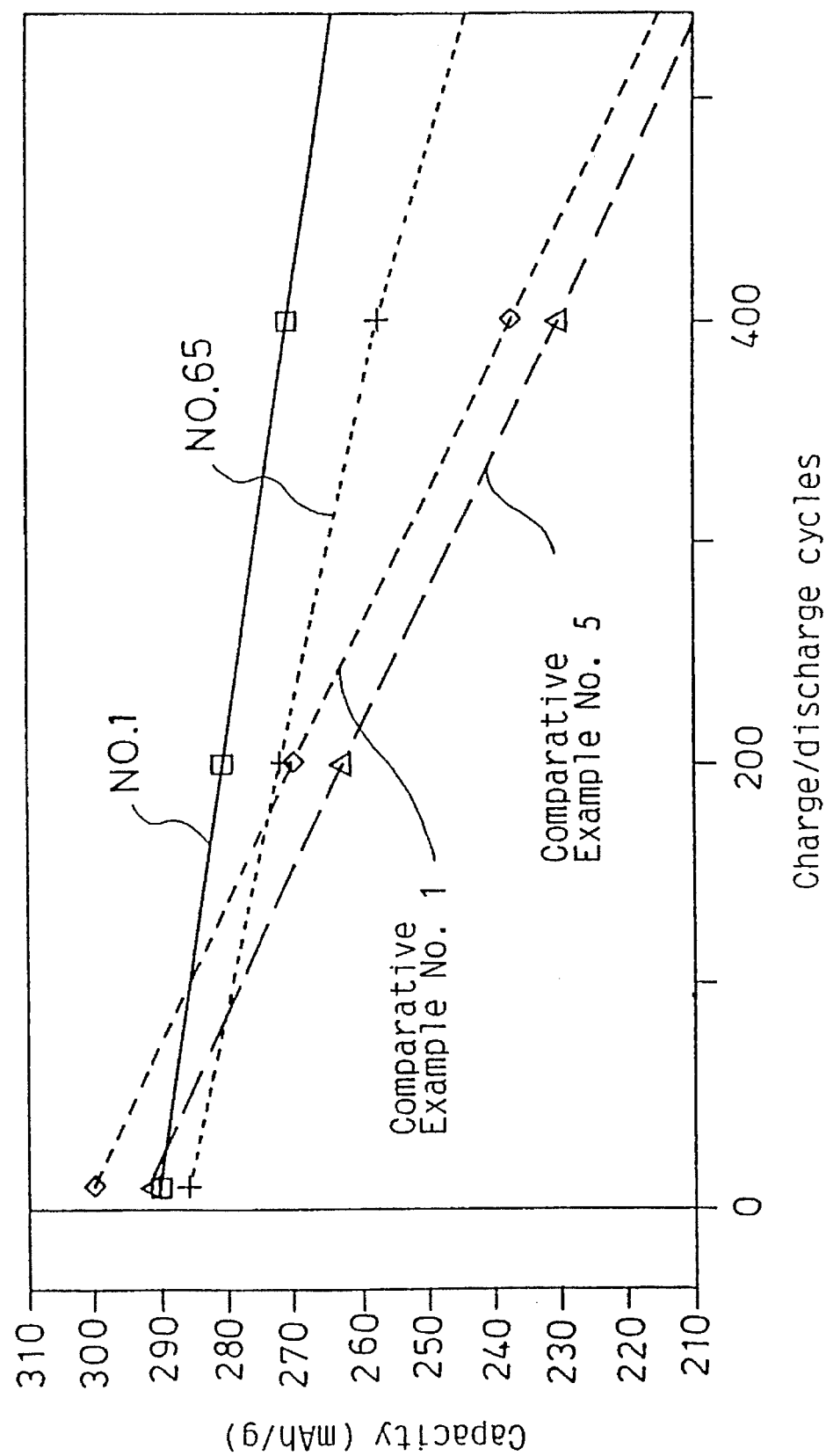
FIG. 3 is a diagram showing the relationships between the discharge capacities and the number of charge/discharge cycles of half-cells configured with, as their negative electrodes, hydrogen storage alloys of the embodiments of the present invention and of the comparative examples with or without heat-treatment.

C. for 10 hours) but not subjected to any heat-treatment is designated as Comparative Example No. 5. FIG. 3 shows the cycle life characteristics of the flooded electrolyte half-cells of which capacity is limited by the negative electrode for evaluation, configured with the negative electrodes made from these alloys. As clearly shown by FIG. 3, the alloy prepared in accordance with the working example of the present invention remarkably improves the cycle life characteristics of the cell configured with the alloy. In contrast to this, the alloy of the comparative example causes a slight increase in the capacity but no change in its cycle life characteristic. On an observation of the disassembled cells, it was found that the alloy which had been subjected to the heat-treatment exhibited a smaller pulverization than those with no heat-treatment.

Figure 4:
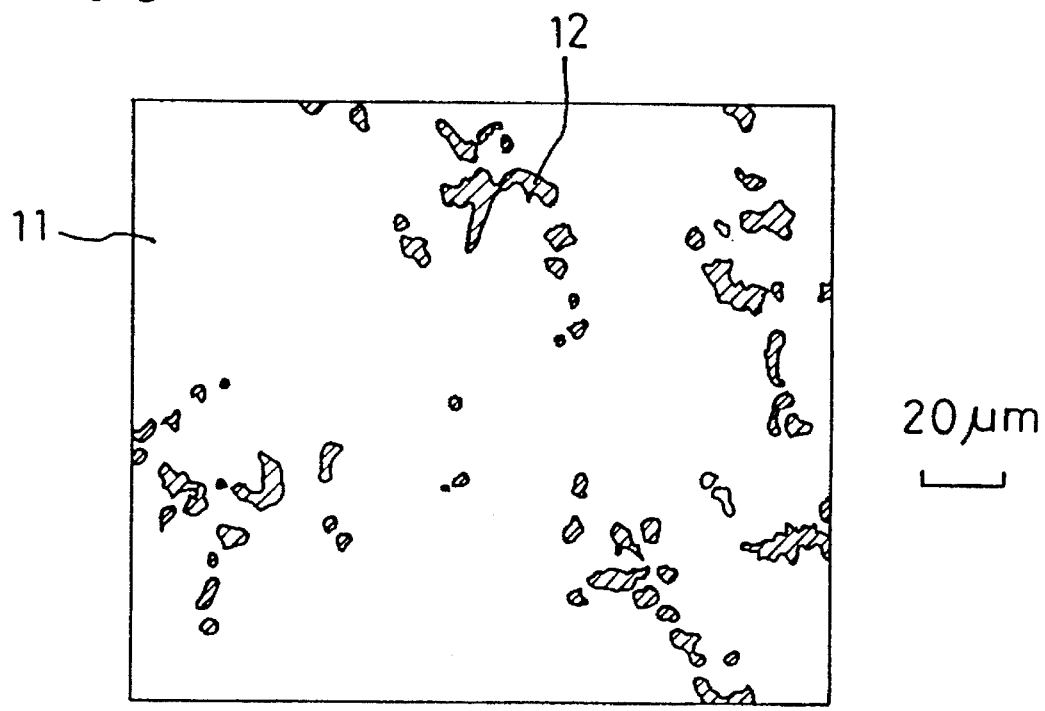
FIG. 4 is a diagram showing a back scattered electron image of a cross-section of the hydrogen storage alloy ingot before heat-treatment in accordance with an embodiment of the present invention.
Figure 5:
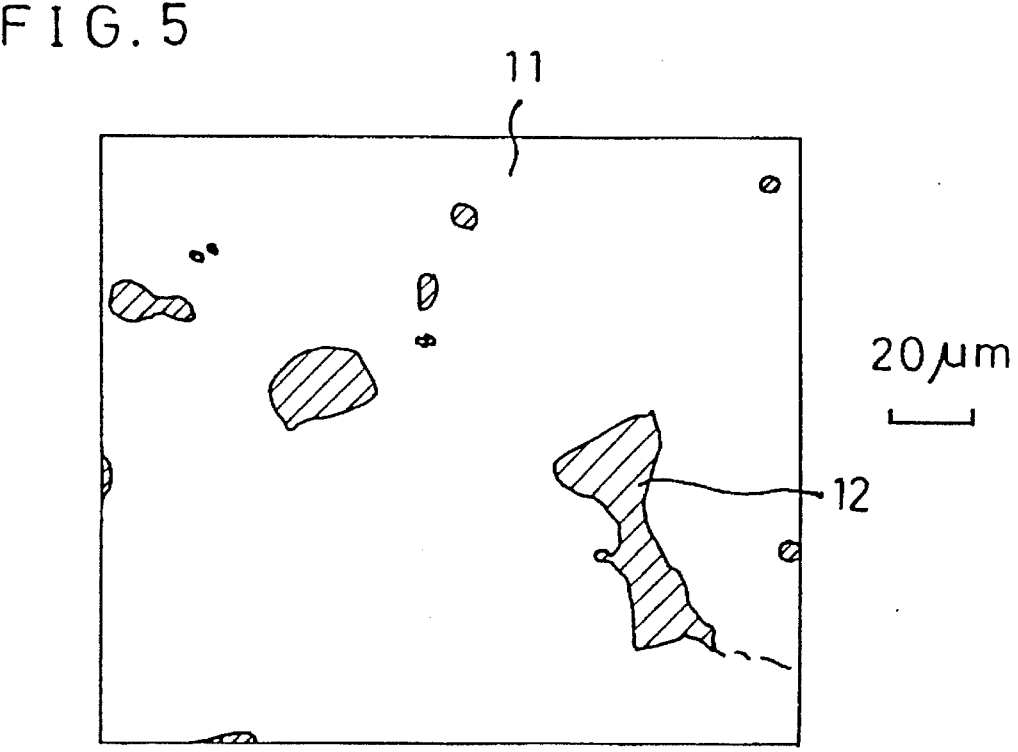
FIG. 5 is a diagram showing a back scattered electron image of a cross-section of the hydrogen storage alloy ingot after heat-treatment in accordance with an embodiment of the present invention.

FIG. 4 and FIG. 5 show the states of the alloy microstructures observed on the back scattered electron image of the alloys of Working Examples. FIG. 4 shows a back scattered electron image of the alloy before the heat-treatment, namely, of Sample No. 65, whereas FIG. 5 shows a back scattered electron image of the alloy after the heat-treatment, namely, of Sample No. 1. From the observation, it is appreciated that a dispersed state of the phase incapable of storing hydrogen in the alloy of the working example changes from the state shown by FIG. 4 to that shown by FIG. 5. An observation on the cross-sectional structure of the alloy ingot after the heat-treatment of the working example reveals that the number of the phases which do not contain Mm and are incapable of storing hydrogen dispersed in the phase which is capable of absorbing and desorbing hydrogen in a reversible manner becomes smaller than that of the alloys before the heat-treatment, and that the area occupied by the dispersed phases which are incapable of storing hydrogen is enlarged by the heat-treatment. Based on the result of EPMA analysis, it is found that the concentration distributions of the respective elements at the boundaries between the phases which contain a scarce amount of Mm and are incapable of storing hydrogen, and the phase which is capable of absorbing and desorbing hydrogen, are distinctly separated. On the contrary, the single phase of the alloy of the comparative example is substantially maintained after the heat-treatment, and no great change is observed between before and after the heat-treatment.

Next, as a result of an investigation on the heat-treatment temperature, it was found that an effect for improving the cycle life was obtained with a heat-treatment at a temperature ranging from 900° C. to 1200° C.

An alloy having the same composition as that of Sample No. 1 and subjected to the heat-treatment at a temperature below 900° C. demonstrated the same cycle life characteristics as those of Sample No. 65 shown in FIG. 3. An observation on back scattered electron imaging of the cross-section of this alloy revealed an alloy microstructure similar to FIG. 4. On the other hand, an alloy subjected to the heat-treatment at 950° C. demonstrated a cycle life characteristic equivalent to that of Sample No. 1 which had been heat-treated at 1000° C. A cycle life characteristic of an alloy which had been heat-treated at a temperature between 900° C. and 950° C. was between that of Sample No. 65 and that of Sample No. 1, and this fact indicated that the cycle life characteristic is more improved as the heat-treatment temperature rises. According to the observation on the cross-section of various alloys, it is appreciated that the dispersed state of the phase incapable of storing hydrogen changes stepwise with the rise of the heat-treatment temperature, and becomes a state similar to the alloy microstructure of Sample No. 1. Moreover, no particular difference was recognized between the alloys heat-treated at 950° C., 1000° C. and 1100° C., respectively, in the cycle life characteristic, as well as in the results of the observation on the cross-section of the alloy ingots.

The temperature was composition-dependent which is effective for improving the cycle life characteristics of the cells configured with the alloys, and it was recognized that a heat-treatment at a temperature ranging from 900° C. to 1200° C. (but lower than the melting point of the alloy) was effective for improving the cycle life of the hydrogen storage alloy in accordance with the present invention. If the heat-treatment temperature is too high, the alloy ingot will be molten. Although the melting point differs according to the composition, it ranged, in this embodiment, from approximately 1200° C. to 1300° C.

In a case of heat-treating the alloy at a temperature which approximates to the melting point of the alloy, the effect of cycle life improvement can be expected within a short period of about 30 minutes, but when heat-treating the alloy at a temperature which approximates to 900° C., a time period of 10 hours or longer is required. It is therefore preferable to perform the heat-treatment at a temperature ranging from 900° C. to 1200° C. for at least one hour.

Next, from an investigation on an atmosphere of the heat-treatment, it was appreciated that the same effect as obtained with the treatment in the inert gas atmosphere was also achieved by a heat-treatment in a vacuum.

The alloy having, in its alloy microstructure, the phase consisting mainly of an element or elements other than Mm and being incapable of storing hydrogen in accordance with the present invention demonstrates an essentially favorable cycle life characteristic even without a heat-treatment. It is however possible to further improve the cycle life of the alloy having, in its alloy microstructure, the phase consisting mainly of an element or elements other than Mm and being incapable of storing hydrogen in accordance with the present invention, by the heat-treatment at a temperature higher than 900° C.

It was also found in further experiment that an alloy containing Fe or Cr in addition to the alloys of the Mm-Ni-Al-Mn-Cu-Co system can be improved by the heat-treatment to have a longer cycle life.

In the above description, the alloys of the Mm-Ni-Al-Mn-Cu-Co system and of the Mm-Ni-Al-Mn-Fe-Cr system were discussed in detail. As a result of the test on the alloys of an arbitrary combination of the elements of Al, Mn, Cu, Co, Fe, Cr, Zr, Ti, V and the like, which are respectively used as M, it was found that any alloy demonstrates a long cycle life which can be improved much more by the heat-treatment, only if the alloy satisfies the conditions that it has a microstructure wherein the phase consisting mainly of an element or elements other than Mm and being incapable of storing hydrogen is dispersed in the host hydrogen storage phase.

EXAMPLE 4

Next, a starved electrolyte and sealed-type nickel-metal hydride storage battery of which capacity is limited by the positive electrode was configured by using the hydrogen storage alloy of the present invention in the following manner.

(1) Positive Electrode

First, the respective powders of nickel hydroxide, metal cobalt, cobalt hydroxide and zinc oxide were weighed in a ratio by weight of 100:7:5:2.5, and after mixed well, water was added to 20 g of the mixed powder to obtain a paste. This paste was filled in a foamed nickel electrode support having a length of 81 mm, a width of 60 mm and a weight of 3.1 g, and after dried, the filled electrode support was compressed to have a thickness of 1.74 mm to produce a positive electrode plate. A nickel plate as a lead conductor was spot-welded on an end of this positive electrode plate. The theoretical capacity of this positive electrode plate was 5.05 Ah per each plate. Five (5) sheets of this positive electrode plate were employed in one battery for the test.

(2) Negative Electrode

On the other hand, the hydrogen storage alloy having the same composition as that of Sample No. 1 was used as the negative electrode. That is, the powders of the alloy represented by the formula $MmNi_{4.0}Al_{0.5}Mn_{0.5}Cu_{0.4}Co_{0.1}$, carboxymethyl cellulose, a copolymer of styrene-butadiene and water were mixed in a ratio by weight of 100:0.5:1:20 and kneaded to obtain a paste. A punched metal sheet having a length of 81 mm, a width of 60 mm and a weight of 2.1 g was coated with this paste, and after dried, the coated sheet was roll-pressed to have a thickness of 1.20 mm to produce a negative electrode plate. A nickel plate as a lead conductor was spot-welded on an end of this negative electrode plate. The amount of the alloy in one coated plate was 19.4 g and the theoretical capacity of this negative electrode plate was 5.63 Ah per each plate. Six (6) sheets of this negative electrode plate were employed in one battery for the test.

Figure 6:
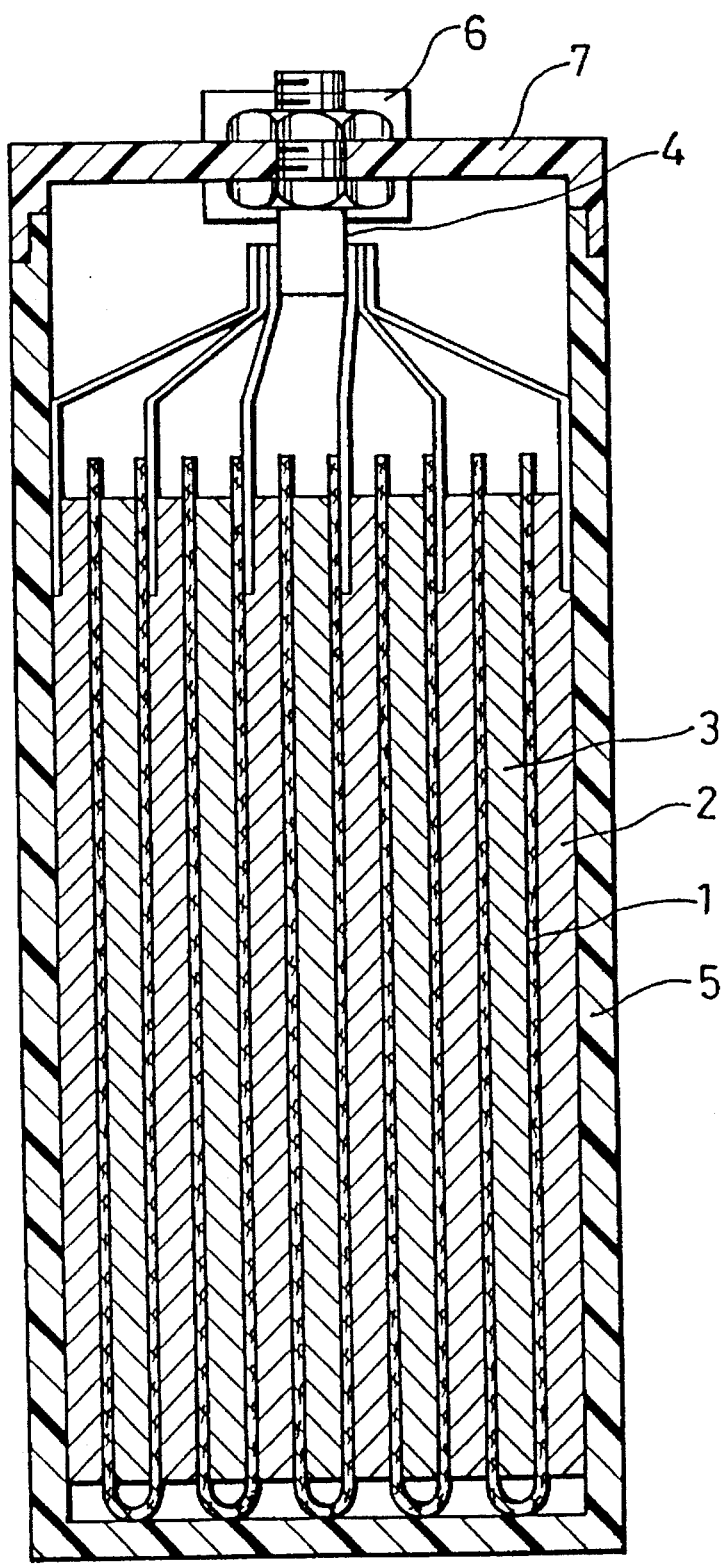
FIG. 6 is a longitudinal cross-sectional view showing a schematic configuration of a sealed-type battery in accordance with another embodiment of the present invention.

FIG. 6 is a longitudinal cross-sectional view showing a schematic configuration of a sealed-type nickel-metal hydride storage battery incorporating the above-mentioned positive electrode plate and negative electrode plate. In this configuration, the negative electrode plate 2 and the positive electrode plate 3 are laminated placing separators 1 made of sulfonated polypropylene unwoven fabric inbetween. The lead conductors of the negative electrodes and the lead conductors of the positive electrodes are spot-welded to a negative terminal 4 made of nickel and a positive terminal made of nickel, respectively. An electrode assembly thus configured is inserted into a battery casing 5 made of acrylonitrile-styrene copolymer resin of a thickness of 5 mm, having a length of 108 mm, a depth of 69 mm and a width of 18 mm. In the battery casing 5 containing the electrode assembly, 54 ml of an electrolyte of potassium hydroxide aqueous solution having a specific gravity of 1.3 is poured.

A sealing plate 7 made of acrylonitrile-styrene copolymer resin, provided with a safety valve 6 which is ready to operate at 3 atm., is adhered to the battery casing with an epoxy resin. Thereafter, the positive terminal and the negative terminal are liquid-tightly fixed on the sealing plate 7 to produce a sealed-type battery. This is named Sample No. 66.

In a manner similar to that discussed above, another starved electrolyte and sealed-type nickel-metal hydride storage battery was configured by using the hydrogen storage alloy represented by the formula $MmNi_{3.5}Al_{0.3}Mn_{0.4}Co_{0.8}$, which has the same composition as Comparative Example No. 3 and an alloy of a single phase, as its negative electrode. This is named Comparative Example No. 6.

Figure 7:
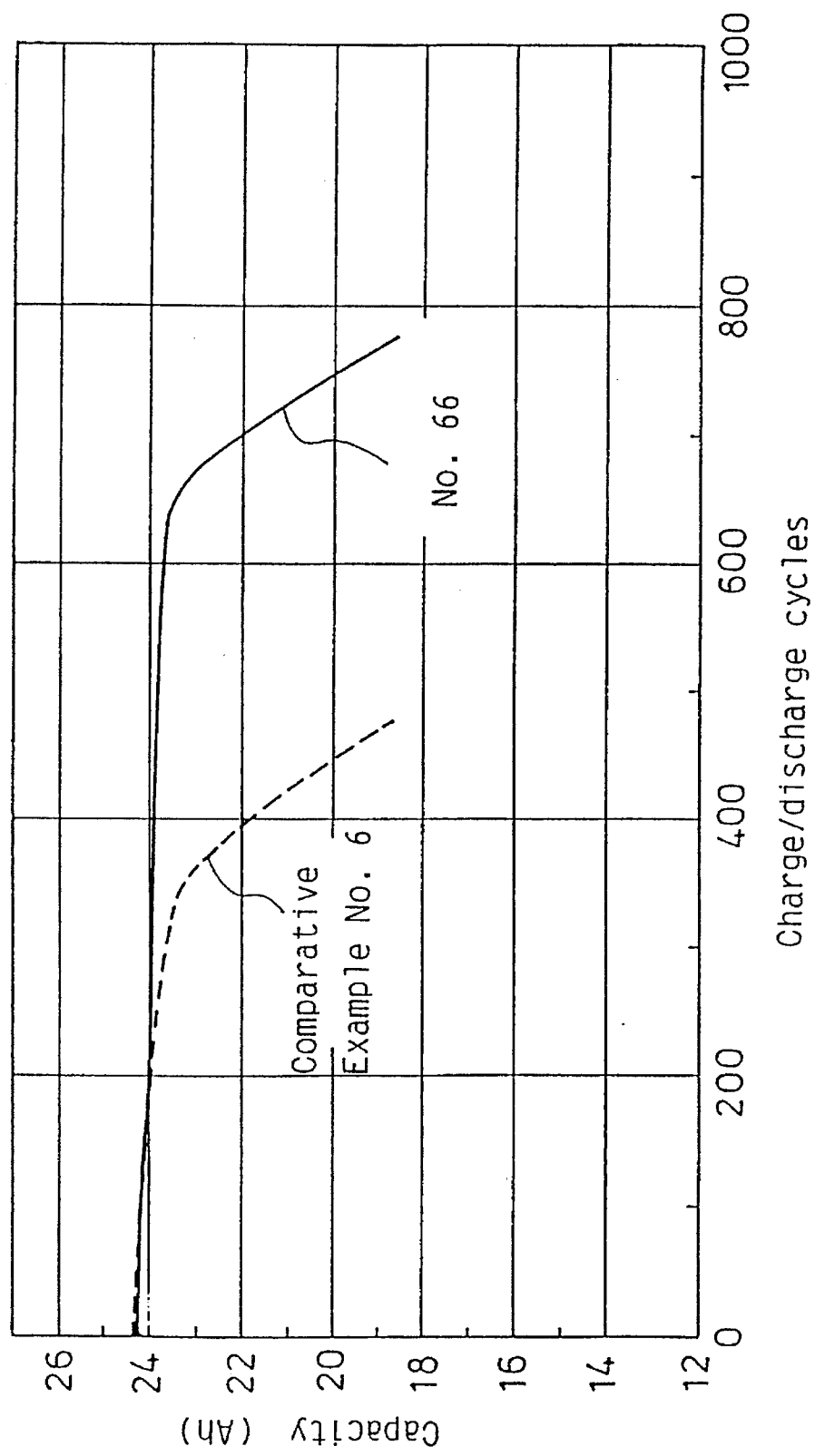
FIG. 7 is a diagram showing the relationships between the discharge capacities and the number of charge/discharge cycles of the sealed-type batteries in accordance with still another embodiment of the present invention and a comparative example.

These batteries were subjected to cycle life tests by repeating charging and discharging operations in a mode wherein they are charged at a 3-hour rate (8.43 A) for one hour and discharged at the same 3-hour rate until the terminal voltage decreased to 1 V. FIG. 7 is a diagram showing the relationships between the number of cycles and the discharge capacity of the respective batteries. The discharge capacity was obtained by, after charged at a 10-hour rate (2.53 A) for 15 hours, discharging at a 5-hour rate (5.06 A) until the terminal voltage decreased to 1 V at room temperature.

In the flooded electrolyte half-cell of which capacity is limited by the negative electrode, the alloys of Sample No. 1 and Comparative Example No. 3 demonstrated approximately the same cycle life. In the starved electrolyte and sealed-type nickel-metal hydride storage battery of which capacity is limited by the positive electrode, Sample No. 66, which employed the alloy having the same composition as Sample No. 1, demonstrated a longer cycle life than Comparative Example No. 6, which employed the alloy having the same composition as Comparative Example No. 3.

Further, the inner pressure of the battery of Sample No. 66 was 0.9 kg/cm² at the end of charging operation whereas the inner pressure of the battery of Comparative Example No. 6 was 2.1 kg/cm² at the end of charging operation. This fact indicates that the sealed-type nickel-metal hydride battery configured with the alloy in accordance with the present invention is very excellent not only in the cycle life characteristics but also in the inner pressure of the battery. When these batteries were rapid-charged at a 1-hour rate after they were subjected to 100 cycles of charging and discharging operation, the inner pressure of the battery rose up to 15 kg/cm² at the end of charging operation in the case of Comparative Example No. 6 but remained at only 6.5 kg/cm² at the end of charging operation in the case of Sample No. 66. Therefore, the operating pressure of the safety valve of the nickel-metal hydride storage battery of the present invention can be lowered. In an application wherein a rapid charging is required, the battery in accordance with the present invention can be used at an operating pressure of the safety valve of about 10 kg/cm².

Moreover, as a result of the charging and discharging cycle tests performed on the starved electrolyte and sealed-type nickel-metal hydride storage batteries of which capacity is limited by the positive electrode of AA size (about 1 Ah), it was confirmed that these batteries have a surpassing long cycle life and a moderate rise in the inner pressure of the battery, when the alloys in accordance with the present invention are used as the negative electrode.

EXAMPLE 5

Next, a result of an investigation on the composition of the electrolyte will be illustrated with reference to Table 3 below.

The electrolytes for Sample No. 66 and for Comparative Example No. 6 were potassium hydroxide (KOH) of an aqueous solution having a specific gravity of 1.3. Sample Nos. 67–79 employed a mixed solution of an alkali aqueous solution also added with sodium hydroxide (NaOH) and/or lithium hydroxide (LiOH) in addition to KOH as their electrolytes. In Sample Nos. 67–79, an alloy having the same composition as that of Sample No. 66 was employed as the negative electrodes. The hydrogen storage alloy of Comparative Example No. 7 has the same composition as that of Comparative Example No. 6 and its electrolyte is the same as that of Sample No. 67.

TABLE 3

| Sample No. | Specific gravity of electrolyte | Ratio by weight of solutes | | | Cycle life characteristics* (cycle) | High-rate discharge characteristics** (%) |
|---|---|---|---|---|---|---|
| | | KOH (wt %) | NaOH (wt %) | LiOH (wt %) | | |
| 66 | 1.3 | 100 | 0 | 0 | 700 | 90 |
| 67 | 1.3 | 78 | 20 | 2 | 900 | 87 |
| 68 | 1.1 | 78 | 20 | 2 | 350 | 83 |
| 69 | 1.2 | 78 | 20 | 2 | 850 | 86 |
| 70 | 1.4 | 78 | 20 | 2 | 900 | 87 |
| 71 | 1.5 | 78 | 20 | 2 | 450 | 86 |
| 72 | 1.3 | 98 | 0 | 2 | 850 | 89 |
| 73 | 1.3 | 88 | 10 | 2 | 850 | 88 |
| 74 | 1.3 | 68 | 30 | 2 | 950 | 86 |
| 75 | 1.3 | 58 | 40 | 2 | 800 | 75 |
| 76 | 1.3 | 80 | 20 | 0 | 800 | 89 |
| 77 | 1.3 | 78 | 20 | 2 | 900 | 88 |
| 78 | 1.3 | 76 | 20 | 4 | 900 | 85 |
| 79 | 1.3 | 75 | 20 | 5 | 850 | 76 |
| Comparative Example No. | | | | | | |
| 6 | 1.3 | 100 | 0 | 0 | 400 | 84 |
| 7 | 1.3 | 78 | 20 | 2 | 400 | 82 |

*Number of cycles until the battery capacity drops to 90% of its initial value
**(1C discharge capacity)/(0.2C discharge capacity at 0° C.) × 100 (%)

As clearly shown in Table 3, an improvement in the cycle life is observed with Sample No. 67 as compared with Sample No. 66, by adding NaOH and LiOH to the electrolyte whereas the cycle life of Comparative Example No. 7 does not change regardless of the change in the electrolyte composition. It is therefore confirmed that the cycle life can be improved by making the electrolyte a mixed solution of KOH, NaOH and LiOH in the case of the alloy in accordance with the present invention. Based on the data of Sample Nos. 68–71, it is confirmed that the cycle life is worsened if the specific gravity of the electrolyte deviates from the range between 1.2 and 1.4. Further, based on the data of Sample Nos. 72–79, it is confirmed that a favorable high-rate discharge characteristic at a low temperature cannot be attained unless the amount of NaOH is made 30 wt % or less and that of LiOH is made 4 wt % or less of the total solutes in the electrolyte. It is therefore concluded that it is desirable for the electrolyte to be an alkali aqueous solution having a specific gravity of 1.2–1.4, composed of three components of KOH, NaOH and LiOH, wherein the amount of KOH is 66 wt % or more, that of NaOH is 30 wt % or less, and that of LiOH is 4 wt % or less, in particular, ranging from 2 wt % to 4 wt %.

EXAMPLE 6

In the following paragraphs, the result of the investigation on the positive/negative electrode capacity ratio will be described.

Figure 8:
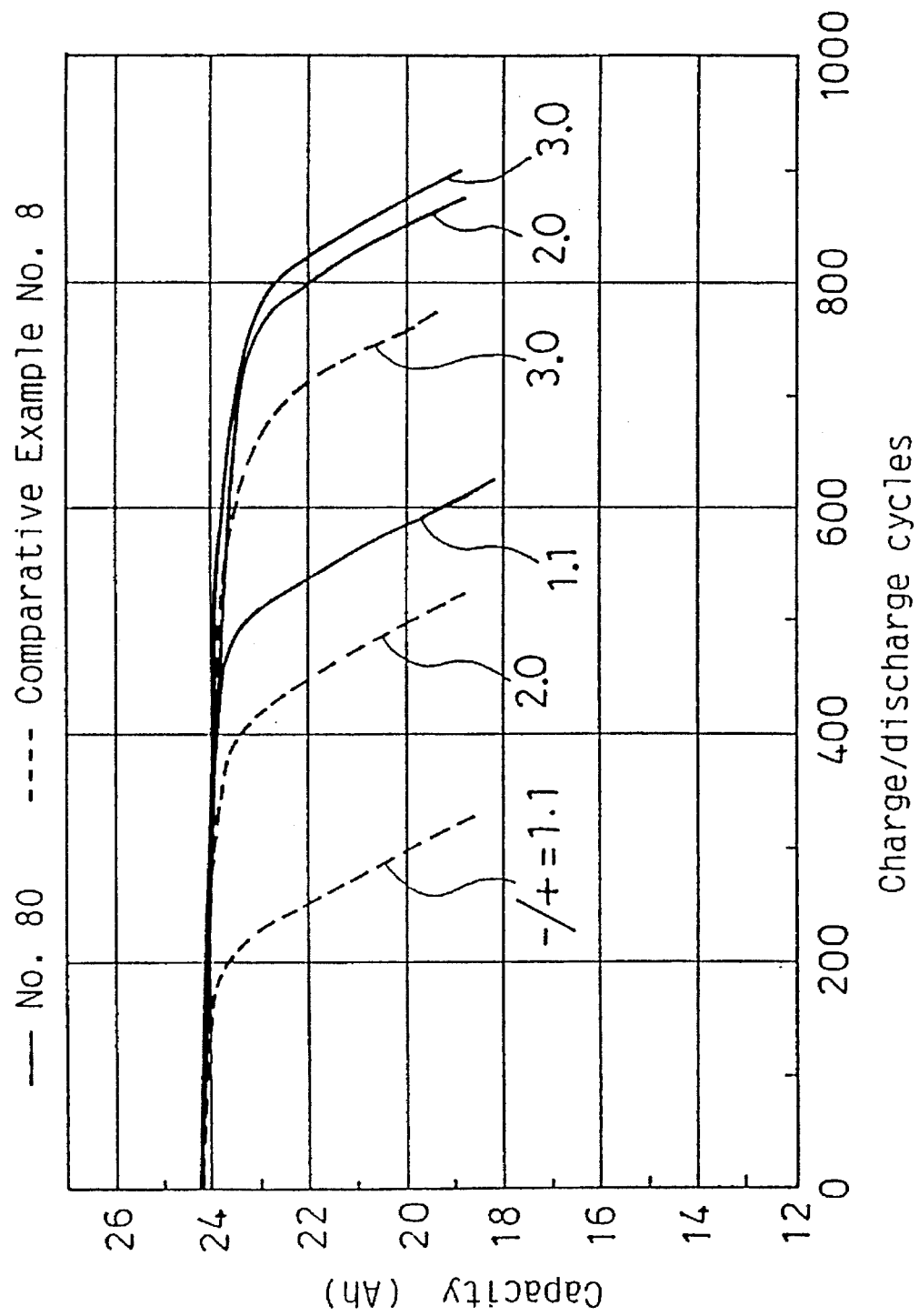
FIG. 8 is a diagram showing the relationships between the discharge capacities and the number of charge/discharge cycles for the respective negative electrode/positive electrode capacity ratio of the sealed-type batteries in accordance with an embodiment of the present invention and the comparative examples.

The capacity ratio of negative electrode to positive electrode (negative electrode capacity/positive electrode capacity) of Sample No. 66 is 1.33. FIG. 8 is a diagram showing the relationships between the capacities and the number of cycles in the cases of changing the capacity ratio starting from the batteries of Sample No. 66 and Comparative Example No. 6 to those of Sample No. 80 and Comparative Example No. 8.

From this diagram, it is appreciated that the larger the capacity ratio is, the longer the cycle life is in a range between 1.1 and 2 but the cycle life cannot be elongated at a capacity ratio of 2 or larger. Since the energy density of a battery lowers with an increase of the capacity ratio, a capacity ratio of 2 or smaller is appropriate. On the contrary, a battery of which capacity is limited by the positive electrode cannot be configured with the capacity ratio of 1 or smaller.

On the other hand, in Comparative Example No. 8, although the deterioration in the capacity is more rapid than Sample No. 80, the cycle life characteristic is made favorable by increasing the capacity ratio. It is therefore desirable in the case of the alloy in accordance with the present invention to adopt a capacity ratio between 1.1 and 2. When this capacity ratio is converted into weight, it is appropriate to make the amount of the hydrogen storage alloy included in the negative electrode 1–2 g per 1 g of nickel hydroxide included in the positive electrode.

EXAMPLE 7

A coating-type method for manufacturing negative electrode was employed in Sample No. 66 and Comparative Example No. 6, but, in this Example, a battery was configured in accordance with a manufacturing method of filling a paste composed mainly of the hydrogen storage alloy and water in the foamed nickel electrode support. A battery configured with a hydrogen storage alloy having the same composition as that of Sample No. 66 is named Sample No. 81, and a battery configured with a hydrogen storage alloy having the same composition as that of Comparative Example No. 6 is named Comparative Example No. 9.

A comparison was made on the battery inner pressures at the end of charging operation of Sample Nos. 66 and 81, and that of Comparative Example Nos. 6 and 9. The values were 0.9 kg/cm$^2$ for Sample No. 66 and 2.3 kg/cm$^2$ for Comparative Example No. 6, whereas the values were 1.7 kg/cm$^2$ for Sample No. 81 and 2.4 kg/cm$^2$ for Comparative Example No. 9. It is therefore appreciated that the hydrogen storage alloy of the present invention can suppress the rise in the inner pressure of the battery at the time of charging when applied to the coated-type negative electrode.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A hydrogen storage alloy represented by the general formula MmNi$_x$M$_y$, wherein Mm is a misch metal or a mixture of rare earth elements, and M is at least one element selected from the group consisting of Al, Mn, Co, Cu, Fe, Cr, Zr, Ti and V, and wherein $5.0 \geq x+y \geq 5.5$, said alloy having a microstructure comprising:

a phase which is composed of a crystal structure of CaCu$_5$ type, and is capable of absorbing and desorbing hydrogen in a reversible manner, and at least one phase which consists mainly of an element or elements other than Mm, and is incapable of storing hydrogen.

2. The hydrogen storage alloy in accordance with claim 1, wherein Mm content of said phase incapable of storing hydrogen is less than 5 wt %.

3. The hydrogen storage alloy in accordance with claim 1, wherein $5.2 \geq x+y \geq 5.5$.

4. A hydrogen storage alloy represented by the general formula $MmNi_aAl_bMn_cCu_dCo_e$, wherein Mm is a misch metal or a mixture of rare earth elements, and wherein $0.2 \geq b \geq 0.8$, $0.2 \geq c \geq 0.8$, $0.8 \geq b+c \geq 1.4$, $0 \geq d \geq 0.8$, $0 \geq e \geq 0.3$, and $5.2 \geq a+b+c+d+e \geq 5.5$, and an amount of La contained in said Mm is in a range between 40 wt % and 70 wt %, said alloy having a microstructure comprising:

- a phase which is composed of a crystal structure of $CaCu_5$ type, and is capable of absorbing and desorbing hydrogen in a reversible manner, and
- at least one phase which consists mainly of an element or elements other than Mm, and is incapable of storing hydrogen.

5. A hydrogen storage alloy represented by the general formula $MmNi_aAl_bMn_cCu_dCo_eFe_f$, wherein Mm is a misch metal or a mixture of rare earth elements, and wherein $0.2 \geq b \geq 0.8$, $0.2 \geq c \geq 0.8$, $0.8 \geq b+c \geq 1.4$, $0 \geq d \geq 0.8$, $0 \geq e \geq 0.3$, $0 < f \geq 0.3$, and $5.2 \geq a+b+c+d+e+f \geq 5.5$, and an amount of La contained in said Mm is in a range between 40 wt % and 70 wt %, said alloy having a microstructure comprising:

- a phase which is composed of a crystal structure of $CaCu_5$ type, and is capable of absorbing and desorbing hydrogen in a reversible manner, and
- at least one phase which consists mainly of an element or elements other than Mm, and is incapable of storing hydrogen.

6. A hydrogen storage alloy represented by the general formula $MmNi_aAl_bMn_cCu_dCo_eFe_fCr_g$, where Mm is a misch metal or a mixture of rare earth elements, and wherein $0.2 \geq b \geq 0.8$, $0.2 \geq c \geq 0.8$, $0.8 \geq b+c \geq 1.4$, $0 \geq d \geq 0.8$, $0 \geq e \geq 0.3$, $0 < f \geq 0.3$, $0 < g \geq 0.1$, and $5.2 \geq a+b+c+d+e+f+g \geq 5.5$, and an amount of La contained in said Mm is in a range between 40 wt % and 70 wt %, said alloy having a microstructure comprising:

- a phase which is composed of a crystal structure of $CaCu_5$ type, and is capable of absorbing and desorbing hydrogen in a reversible manner, and
- at least one phase which consists mainly of an element or elements other than Mm, and is incapable of storing hydrogen.

7. A hydrogen storage alloy represented by the general formula $MmNi_hAl_iMn_jFe_kCr_l$, wherein Mm is a misch metal or a mixture of rare earth elements, and $0.2 \geq i \geq 0.8$, $0.2 \geq j \geq 0.8$, $0.8 \geq i+j \geq 1.4$, $0 \geq k \geq 0.8$, $0 \geq l \geq 0.1$, $5.2 \geq h+i+j+k+l \geq 5.5$, and an amount of La contained in said Mm is in a range between 40 wt % and 70 wt %, said alloy having a microstructure comprising:

- a phase which is composed of a crystal structure of $CaCu_5$ type, and is capable of absorbing and desorbing hydrogen in a reversible manner, and
- at least one phase which consists mainly of an element or elements other than Mm, and is incapable of storing hydrogen.

8. The hydrogen storage alloy in accordance with claim 1, wherein said alloy contains yttrium (Y).

9. The hydrogen storage alloy in accordance with claim 8, wherein the content of Y is 1 wt % or less.

10. The hydrogen storage alloy in accordance with claim i, wherein said phase incapable of storing hydrogen is dispersed in said phase capable of absorbing and desorbing hydrogen in a reversible manner, and a total area of said phase incapable of storing hydrogen is $100 \times 10^{-6}$ $cm^2$ or smaller per $500 \times 10^{-6}$ $cm^2$ of arbitrary cross-sectional area of the alloy ingot.

11. A hydrogen storage alloy prepared by subjecting the hydrogen storage alloy in accordance with claim 1 to a heat treatment in a vacuum or in an inert-gaseous atmosphere at a temperature of 900° C. to 1200° C. for at least one hour.

12. A hydrogen storage electrode comprising the hydrogen storage alloy in accordance with claim 1 or a hydride thereof.

13. A nickel-metal hydride battery comprising an electric current generating unit and a sealed-type battery casing provided with a safety valve which houses said electric current generating unit, said electric current generating unit comprising:

- a positive electrode which comprises a nickel oxide or nickel hydroxide,
- a negative electrode which comprises a hydrogen storage alloy represented by the general formula $MmNi_xM_y$, wherein Mm is a misch metal or a mixture of rare earth elements, and M is at least one element selected from the group consisting of Al, Mn, Co, Cu, Fe, Cr, Zr, Ti and V, and wherein $5.0 \geq x+y \geq 5.5$, said alloy having a microstructure comprising a phase composed of a crystal structure of $CaCu_5$ type, and capable of absorbing and desorbing hydrogen in a reversible manner, and at least one phase consisting mainly of an element or elements other than Mm, and incapable of storing hydrogen,
- a separator inserted between said positive electrode and said negative electrode, and
- an electrolyte which comprises an alkali aqueous solution.

14. The nickel-metal hydride storage battery in accordance with claim 13, wherein an operating pressure of said safety valve is 2–10 $kg/cm^2$.

15. The nickel-metal hydride storage battery in accordance with claim 13, wherein said electrolyte is an alkali aqueous solution composed of three components of potassium hydroxide, sodium hydroxide and lithium hydroxide having a specific gravity of 1.2–1.4, wherein solutes are composed of 66 wt % or more of KOH, 30 wt % or less of NaOH and 4 wt % or less of LiOH.

16. The nickel-metal hydride storage battery in accordance with claim 13, wherein a ratio by weight of the hydrogen storage alloy in the negative electrode is 1–2 g to 1 g of nickel hydroxide in the positive electrode.

17. The nickel-metal hydride storage battery in accordance with claim 13, wherein said negative electrode is an electrode configured by coating a paste comprising a hydrogen storage alloy, a binder and a viscosity-enhancing agent on a conductive electrode support.

* * * * *